No. 736,155. Patented August 11, 1903.

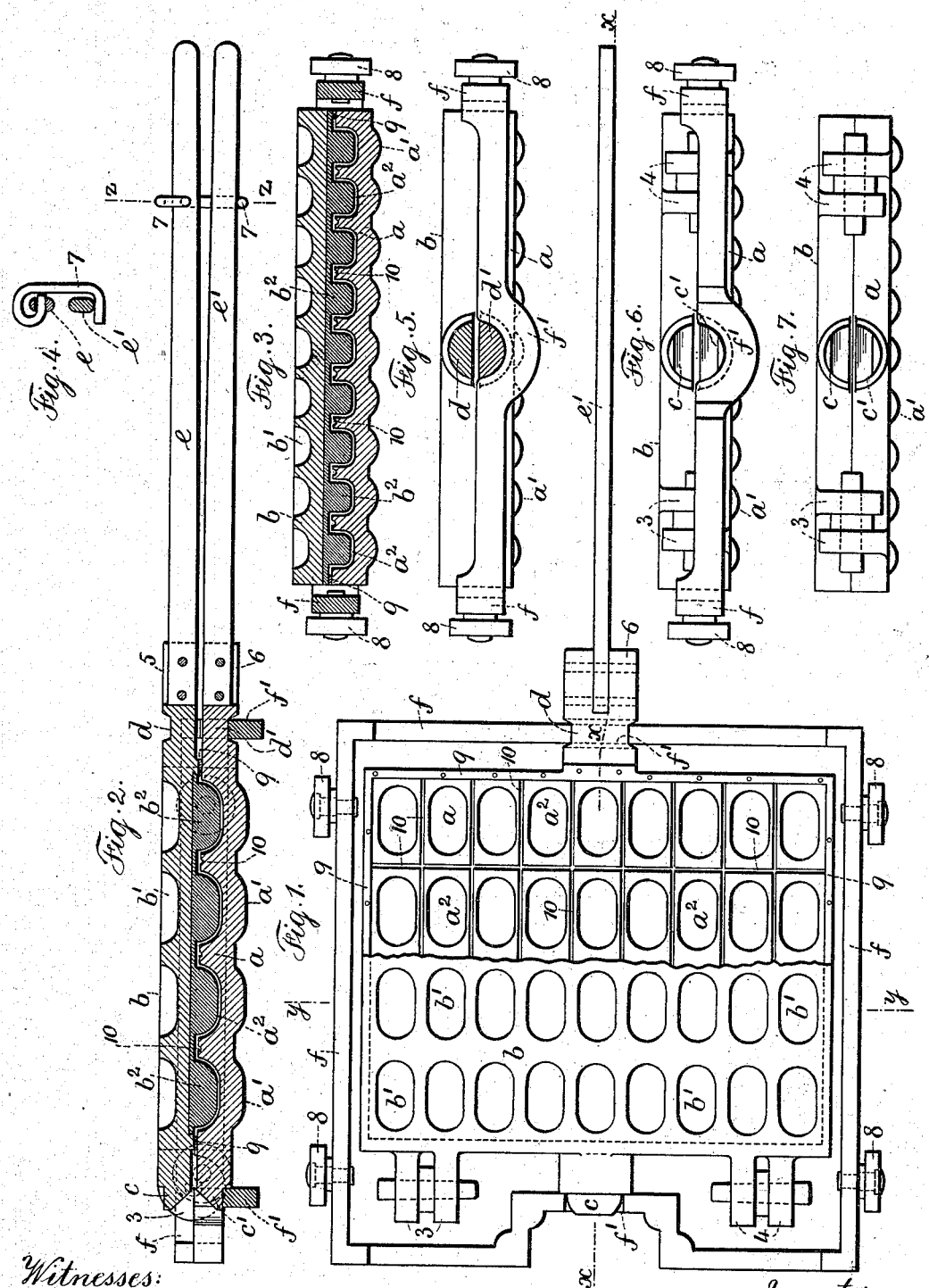

UNITED STATES PATENT OFFICE.

LOUIS RIFKIN, OF NEW YORK, N. Y., AND DAVID GETZOFF, OF EAST ORANGE, NEW JERSEY.

BAKING-IRON FOR WAFERS.

SPECIFICATION forming part of Letters Patent No. 736,155, dated August 11, 1903.

Application filed June 16, 1903. Serial No. 161,649. (No model.)

*To all whom it may concern:*

Be it known that we, LOUIS RIFKIN, of the borough of Manhattan, city, county, and State of New York, and DAVID GETZOFF, of East Orange, in the county of Essex and State of New Jersey, citizens of the United States, have invented an Improvement in Baking-Irons for Wafers, of which the following is a specification.

Our invention relates to devices for manufacturing wafers or edible receptacles for confections, cream, and other edible materials.

In carrying out our invention we provide hinged irons having handles and adapted to be held in a firm relation to one another. Between the juxtaposed surfaces of these irons there are series of spaces adapted to receive a suitable composition of materials in a fluid state for the manufacture of wafers or other edible receptacles. These series of receptacles are formed by series of protuberances on one iron coinciding with series of depressions in the other iron, and a frame is provided for receiving the hinged irons, so that the same may turn in the frame and the frame with the irons be run upon a track over the fire and away from the same, so as to open the irons, remove the wafers or receptacles, and supply fresh fluid material for the making of other wafers or receptacles.

The particular construction of the irons is hereinafter more particularly set forth.

In the drawings, Figure 1 is a plan view representing the device of our invention, one of the irons being in part broken away, so as to show the upper surface of one and the inner surface of the other. Fig. 2 is a vertical and longitudinal section at $x\ x$ of Fig. 1. Fig. 3 is a cross-section at $y\ y$ of Fig. 1. Fig. 4 is a cross-section at $z\ z$ of Fig. 2 through the handles, showing the locking-catch for holding the handles together. Fig. 5 is an end elevation and section through the half-trunnions adjacent to the handle end. Fig. 6 is an elevation at the opposite end of Fig. 5, and Fig. 7 is an elevation of the hinged end of the irons.

The irons $a\ b$ are preferably of cast metal and are provided with connecting-hinges 3 4 at one edge and at the same edge with half-trunnions $c\ c'$. Said irons are provided at the opposite edge with half-trunnions $d\ d'$ and half-stem portions 5 6, from which the handles $e\ e'$ extend. These handles are preferably riveted to the stem portions 5 6, and they are connected by a locking-catch 7, which is pivotally connected to one of said handles and adapted to engage the other, substantially as shown in the cross-section Fig. 4.

We provide a rectangular frame $f$ of larger area than the irons $a\ b$, which frame is made with opposite depressed portions $f'$, forming bearings for the trunnions of the irons. One side of said frame $f$ is returned inwardly, so as to receive the half-trunnions $c\ c'$ at its depressed portion $f'$ and at the same time provide in the frame structure for the hinges 3 4. The irons, therefore, are adapted to turn together upon their trunnions in the bearings of the frame $f$ and to be turned over and over above the fire, so as to thoroughly heat the material between the irons. The said frame is provided with rollers 8, which are adapted to not only support the frame $f$ and the irons when in position, but which rollers are adapted to run upon a track extending over the fire and forward of the fire, so that the frame and the irons can be run over the fire while the material between the irons is being cooked, and said parts can be run out away from the fire, so that the irons may be opened and the wafers or other edible receptacles in the sheet form removed from between the irons.

The iron $a$, which in Figs. 1 and 2 is shown lowermost, is provided with raised outer portions $a'$ and coinciding depressed inner portions forming recesses $a^2$, which recesses are of U shape in cross-section and of dishing form in longitudinal section and elliptical in outline. The iron $b$ is provided with depressed outer portions forming recesses $b'$. The inner surface of the iron $b$ is recessed and provided with a bounding edge that is undercut, and a series of protuberances $b^2$, cast, preferably of Babbitt or similar semisoft metal, are made in sheet form—that is to say, with thin intervening web portions—and said sheet of protuberances is secured in the recessed inner surface of the iron $b$, the said protuberances coinciding with the depressions $a^2$ of the iron $a$, but of smaller area, so as to produce between their respective curved surfaces and the surfaces of said depressions and also between the juxtaposed surfaces of the irons $a$ and $b$ a space of substantially even thickness, the edges of which are limited by the edge ribs 9, secured to the iron $a$, and which edge ribs close the aforesaid space between the irons when the irons are brought together. We have shown and prefer to employ in the surface of the iron $a$ a series of grooves 10 at right angles to one another and respectively running between the series of depressions $a^2$. However, instead of these grooves a series of shallow ribs may be employed, the office of which will be to form grooves in the material baked in the irons to lessen the labor of subdivision into individual receptacles.

In the operation of the device the fluid material is poured into the depressions $a^2$ of the iron $a$, and when the iron $b$ is closed down thereon and the protuberances enter the recesses a proportion of this fluid material is forced out to fill the space between the juxtaposed surfaces of the two irons that are in parallel planes and which space is bounded by the edge ribs 9. This material also fills into the grooves 10, where the same are employed, and when the irons connected by the locking-catch 7 and supported by the frame $f$ are placed over the fire and the irons heated the said fluid material is baked into a material like a wafer and which is edible and which in sheet form contains a series of concavo-convex portions, which may be broken up on the line of the grooves 10 into separate parts after the sheet of said concavo-convex portions is removed from between the irons. The series of depressions $b'$ in the iron $b$ reduce the appreciable amount of metal in the iron and provide for more readily heating the same.

The individual wafers or edible receptacles thus formed are adapted for receiving confections, ice-cream, or other edible materials as articles of sale, the said wafers or receptacles being eaten, with their contents, by the purchaser and being designed to be as edible as the materials they contain.

We claim as our invention—

1. A pair of irons hinged together at one edge and means for connecting the same at the opposite edge, said irons being provided with a series of recesses and a series of protuberances at their juxtaposed faces and one iron being provided with ribs bounding said series of depressions and protuberances.

2. A pair of irons hinged together at one edge, means for connecting the same at the opposite edge, said irons being provided with a series of recesses and a series of protuberances at the juxtaposed faces, and one iron being provided with ribs bounding said series of depressions and protuberances, said irons being formed with trunnions and a frame having bearings receiving said irons at the trunnions and adapted to support said irons above a fire.

3. A pair of irons, hinges for connecting the same at one edge, one iron having a series of depressed portions in the inner surface and the other iron having a series of protuberances coinciding with said depressions, but of smaller area, and one of said irons having edge ribs bounding the series of depressions and protuberances, the series of protuberances of the one iron being formed integral with a plate portion adapted to be received in a recess in the inner face of said iron and of different metal than the iron to which the same is connected.

4. A pair of irons, hinges for connecting the same at one edge, and handles at the other edge and means for connecting the same, one of said irons being provided with raised portions on the outer surface and with coinciding depressed portions on the inner surface forming recesses, which depressions are of U shape in cross-section and elliptical in outline, the other iron being provided with a series of depressions in the outer surface forming recesses, and a series of protuberances projecting from the inner surface and agreeing with the series of depressions of the first-named iron, but of smaller area so as to leave between the juxtaposed surfaces an appreciable space, edge ribs bounding the series of protuberances and depressions and forming and limiting the inclosed space, and means for supporting and operating said irons.

5. A pair of irons, hinges for connecting the same at one edge, handles at the other edge and means for connecting the same, one of said irons being provided with raised portions on the outer surface and with coinciding depressed portions on the inner surface forming recesses, which depressions are of U shape in cross-section and elliptical in outline, the other iron being provided with a series of depressions in the outer surface forming recesses and a series of protuberances projecting from the inner surface and agreeing with the series of depressions of the first-named iron, but of smaller area so as to leave between the juxtaposed surfaces an appreciable space, edge ribs bounding the series of protuberances and depressions and forming and limiting the inclosed space, means for supporting and operating said irons, a frame for supporting said irons and providing for a return movement of said irons within said frame, and means for moving the frame and the irons over and off a fire.

Signed by us this 6th day of June, 1903.

LOUIS RIFKIN.
DAVID GETZOFF.

Witnesses:
WILLIAM L. SIMMONS,
ARTHUR N. SLOMON.